April 18, 1950     J. M. HARTMAN     2,504,412
CULTIVATOR
Filed Oct. 6, 1947     3 Sheets-Sheet 1
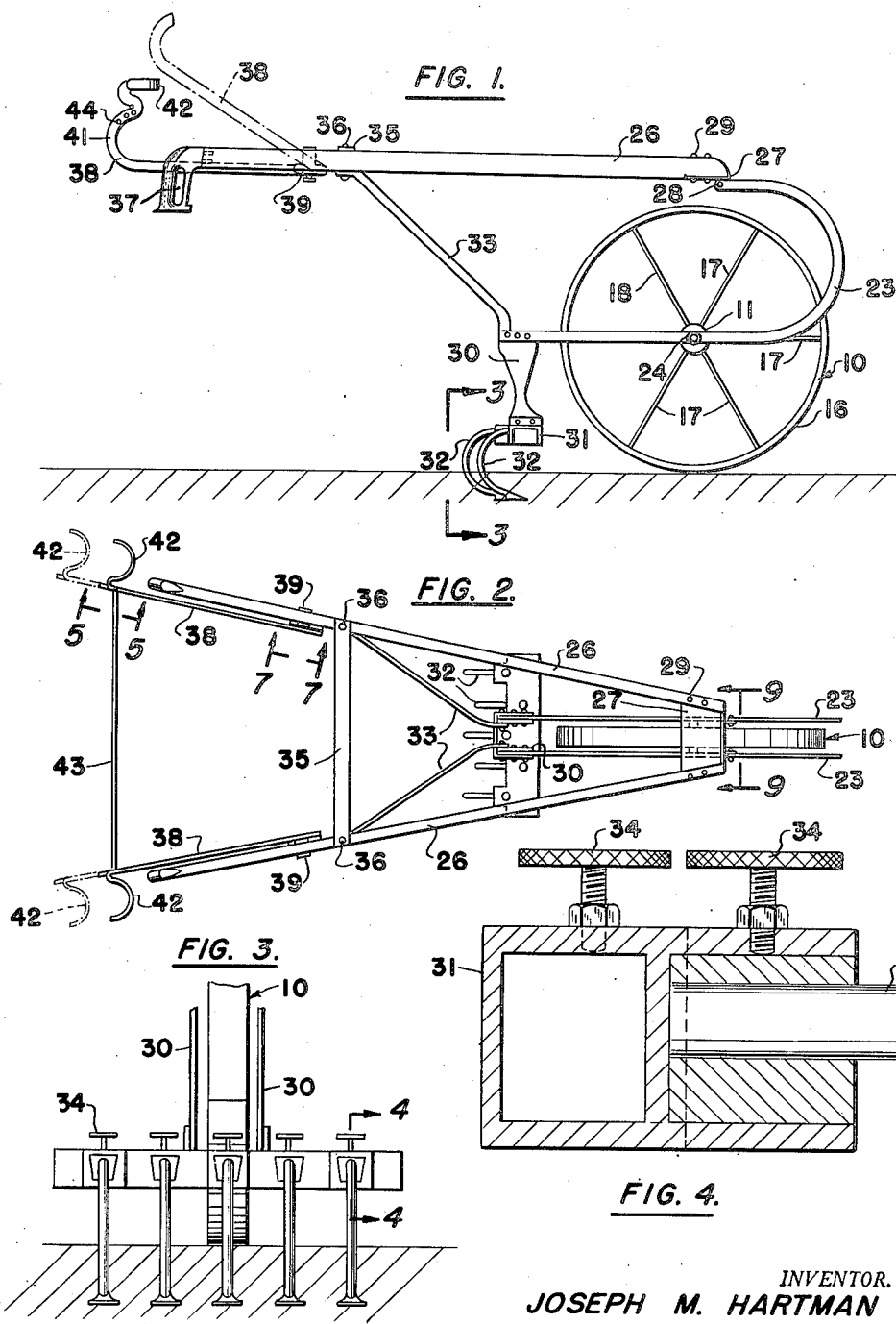
INVENTOR.
JOSEPH M. HARTMAN
BY Howard J. Whelan.
ATTORNEY

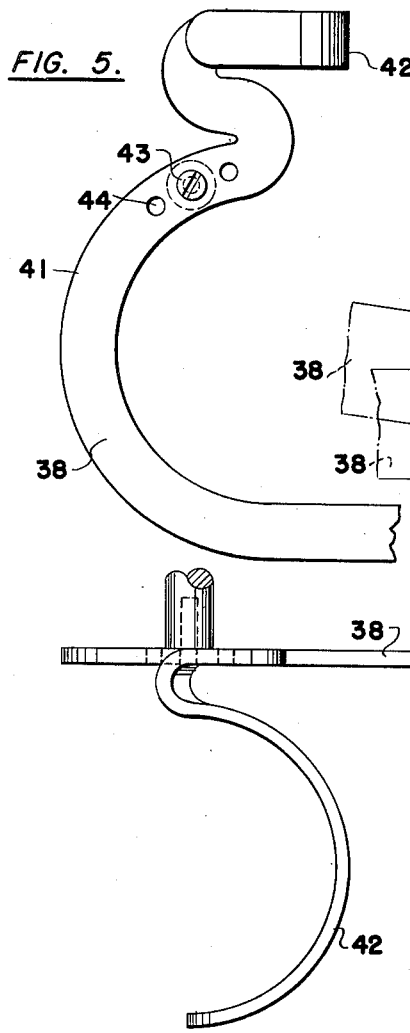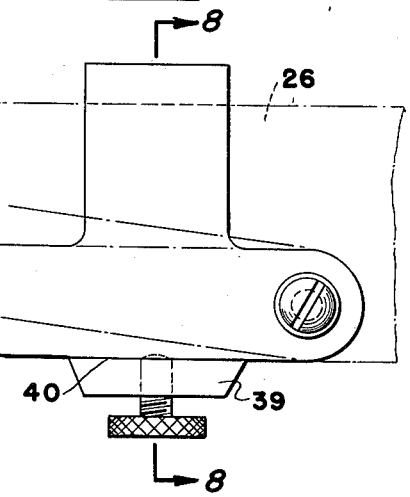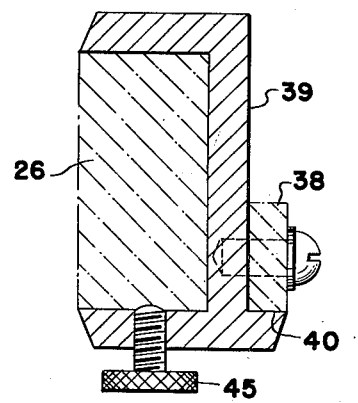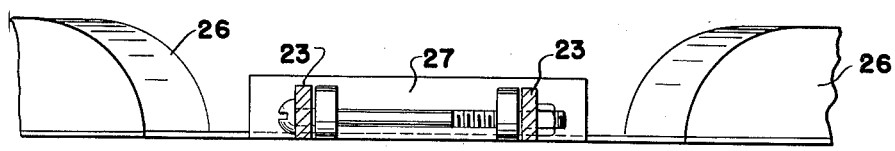
INVENTOR.
JOSEPH M. HARTMAN
BY Howard J. Whelan.
ATTORNEY April 18, 1950     J. M. HARTMAN     2,504,412
CULTIVATOR Filed Oct. 6, 1947     3 Sheets—Sheet 3

INVENTOR.
JOSEPH M. HARTMAN
BY Howard J. Whelan.
ATTORNEY

Patented Apr. 18, 1950

2,504,412

UNITED STATES PATENT OFFICE 2,504,412

CULTIVATOR

Joseph M. Hartman, Washington, D. C.

Application October 6, 1947, Serial No. 778,051

2 Claims. (Cl. 97—59)

This invention refers to equipment for farming and gardening and more particularly to a wheel hoe cultivator.

It has among its objects to provide a farm and garden implement to which the operating power is supplied straight ahead and not into the ground.

An object of this invention is to provide a new and improved wheel hoe cultivator that will avoid one or more of the disadvantages and limitations of the prior art.

A further object of the invention is to provide a new and improved wheel hoe cultivator equipped with adjustable lever bars connected at their rear ends by a motor bar and attached at the front ends to the handle bars to assist in pushing the cultivator.

A still further object of the present invention is to provide a new and improved manually operated cultivator adjustable to suit various types of operators.

Other objects will become apparent as the invention is more fully set forth.

In order that the invention may be more clearly understood attention is hereby directed to the appended drawings, forming part of this application and illustrating one embodiment of the invention.

Referring to the drawings:

Figure 1 is a side elevation of a wheel hoe cultivator embodying this invention;

Figure 2 is a plan view of Figure 1;

Figure 3 is a view looking in the direction of arrows shown in Figure 1, showing the arrangement of the hoes;

Figure 4 is a sectional view taken along line 4—4 of Figure 3;

Figure 5 is a view looking in the direction of arrows 5—5 in Figure 2;

Figure 6 is an enlarged view of the arm holds shown in Figure 2;

Figure 7 is a view looking in the direction of the arrows 7—7 in Figure 2, showing the spring lever bar adjusters;

Figure 8 is a sectional view taken along line 8—8 of Figure 7;

Figure 9 is an end view of Figure 2 looking in the direction of the arrows 9—9;

Similar reference characters refer to similar parts throughout the drawings.

Figure 10:
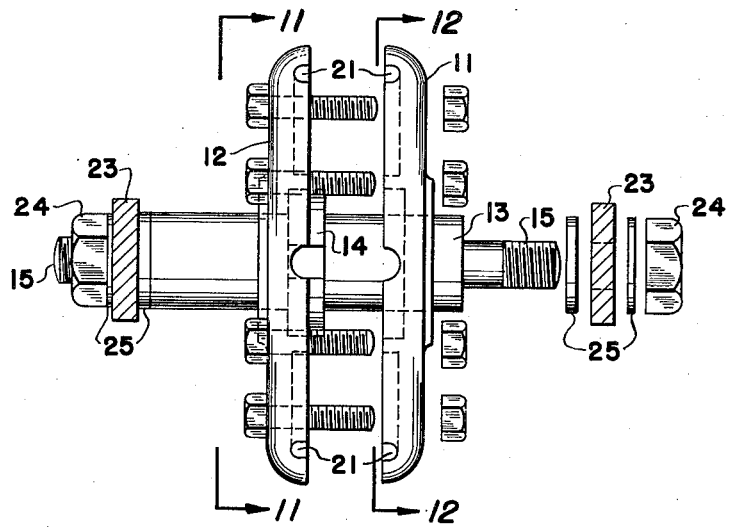
Figure 10 is a blown up view of the wheel hub and axle shown in Figure 1.
Figure 11:
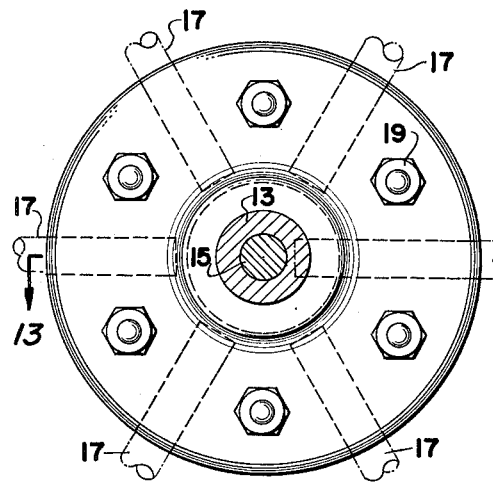
Figure 11 is a view looking in the direction of arrows 11—11 of Figure 10.
Figure 12:
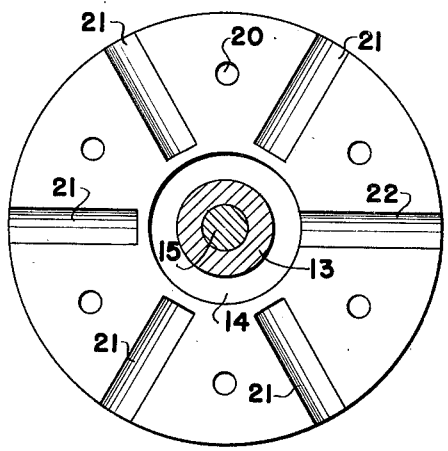
Figure 12 is a view looking in the direction of arrows 12—12 of Figure 10.
Figure 13:
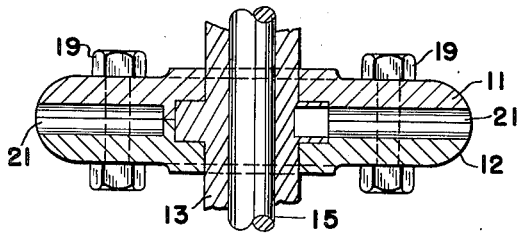
Figure 13 is a sectional view taken along lines 13—13 of Figure 11.

In the drawings 10 represents a wheel used to support the cultivator, the hub is formed of two parts 11 and 12 which are positioned on a sleeve 13 having a shoulder 14 for aligning and centralizing the hub portions 11 and 12 thereon, and is supported on a shaft 15. The rim 16 is supported by a plurality of spokes 17 all of equal length and one spoke 18 being longer and projects into the sleeve 13 to allow the sleeve to turn with the rim and hubs. The hubs 11 and 12 are preferably held together by bolts and nuts 19 positioned in holes 20. Grooves 21 are provided in the hubs 11 and 12 for the placement of the spokes 17 therein, and groove 22 is provided in the hubs to accommodate spoke 18. This type of construction allows a true running light weight wheel to be produced with a minimum of machine operations. The wheel 10 is supported on a pair of braces 23 by extending the shaft 15 through them and locking them in place preferably by nuts 24 and washers 25. The braces 23 are attached at their upper ends by bolts and nuts 28 to a connector 27 which is preferably fastened to the handle bars 26 by bolts and nuts 29. The opposite ends of the braces 23 are connected to a hoe support 30 which supports adjustable clamping device 31 which holds the hoe points 32 through the aid of screws 34. The rear end of the hoe supports 30 are held in position by angular offsets 33 which extend upwardly and join the handle bars 26 and spacer bar 35 and are held together preferably by bolts and nuts 36. The rear ends of the handle bars are provided with hand holds 37 which are positioned slightly below the handle bars proper to remove the strain from the hands of the operator and allow a front thrust to be applied to the handles to cause effective operation of the plow. Lever bars 38 are adjustably positioned on the handle bars 26 by brackets 39 which are provided with shelves 40 that act as stops for the spring lever bars 38 to prevent them from falling below the handle bars 26. The rear ends of the spring lever bars are bent upward at 41 and curved into semi-circular loops at 42 to fit around the arms and are self adjusting to suit the height and shape of the user. A body bar termed a motor bar 43 is positioned in holes 44 in the spring lever bars 38 to suit the user.

In the operation of the device the hands are placed in the hand holes 37, the screws 45 on the brackets 39 are loosened and the loops 42 positioned against the arms to adjust the lever bars 38 in relation to the distance between the hand holds and the arm of the individual user which varies and in this device can be compensated for each individual regardless of the length or shortness of his arms. The motor bar 43 is then positioned in the proper set of holes 41 to allow for differences in body structure of the various users. The device is now ready for use. The hands are place in the hand holds, the lever bar 38 raised to the proper position so they contact the arms of the user who pushes forward with his hands in the hand holds, his arms lending power through the loops 42 and when needed his body may press against the motor bar 43 causing the wheel hoe cultivator to move forward along the surface and not into the ground, such as is the case when an ordinary cultivator is used without the spring lever bars, the motor bar and hand hold positioned under the center line of the handle bars proper.

While but one general form of the invention is shown in the drawings and described in the specifications it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. The combination with a cultivator including a bearing wheel, of a pair of rearwardly extending handles mounted on the wheel, said handles terminating in hand-hold portions, a pair of bars, means for adjustably mounting said bars on said handles at a point adjacent said hand-hold portions, said bars extending parallel to said handles and protruding beyond said hand-hold portions, said bars having semi-circular terminals adapted to fit the arms of the operator, and a body bar having its ends adjustably connected to said bars adjacent the terminals thereof.

2. The combination with a cultivator including a bearing wheel, of a pair of rearwardly extending handles mounted on the wheel, said handles terminating in hand-hold portions, a pair of bars, means for adjustably mounting said bars on said handles at a point adjacent said hand-hold portions, said means comprising channel-shaped brackets straddling said handles, screw means for selectively securing said brackets on said handles, said brackets also having a ledge for guiding said bars, screw means for securing said bars on said brackets, said bars having semi-circular terminals adapted to fit the arms of the operator, and a body bar having its ends adjustably connected to said bars adjacent the terminals thereof.

JOSEPH M. HARTMAN.

REFERENCES CITED

The following references are of record in the file of this patent:

UNITED STATES PATENTS

| Number | Name | Date |
|---|---|---|
| 640,198 | Hoagland | Jan. 2, 1900 |
| 977,737 | Haslup | Dec. 6, 1910 |
| 1,266,964 | Lopour | May 21, 1918 |
| 1,350,906 | Woolf | Aug. 24, 1920 |